(12) United States Patent
Hahn (10) Patent No.: US 10,952,407 B2
(45) Date of Patent: Mar. 23, 2021

(54) RACK FOR ANIMAL CAGES

(71) Applicant: Brian A. Hahn, Fairland, IN (US)

(72) Inventor: Brian A. Hahn, Fairland, IN (US)

( * ) Notice: Subject to any disclaimer, the term of this patent is extended or adjusted under 35 U.S.C. 154(b) by 282 days.

(21) Appl. No.: 16/251,529

(22) Filed: Jan. 18, 2019

(65) Prior Publication Data
US 2019/0150398 A1 May 23, 2019

Related U.S. Application Data

(63) Continuation of application No. 14/824,772, filed on Aug. 12, 2015, now Pat. No. 10,194,635.

(60) Provisional application No. 62/036,650, filed on Aug. 13, 2014.

(51) Int. Cl.
*A01K 1/03* (2006.01)

(52) U.S. Cl.
CPC ............... *A01K 1/03* (2013.01); *A01K 1/031* (2013.01)

(58) Field of Classification Search
CPC .................................. A01K 1/031; A01K 1/03
USPC .................. 119/419, 482, 455, 452
See application file for complete search history.

(56) References Cited

U.S. PATENT DOCUMENTS

| 4,365,590 | A | * | 12/1982 | Ruggieri | A01K 1/031 119/418 |
|---|---|---|---|---|---|
| 5,044,316 | A | * | 9/1991 | Thomas | A01K 1/031 119/419 |
| 5,048,459 | A | * | 9/1991 | Niki | A01K 1/031 119/418 |
| 5,954,013 | A | * | 9/1999 | Gabriel | A01K 1/031 119/419 |
| 6,293,229 | B1 | * | 9/2001 | Edstrom, Sr. | A01K 1/031 119/458 |
| 6,953,266 | B1 | * | 10/2005 | Ver Hage | A01K 1/031 119/452 |
| 7,320,294 | B2 | * | 1/2008 | Irwin | A01K 1/031 119/417 |
| 8,082,885 | B2 | * | 12/2011 | Conger | A01K 1/031 119/419 |
| 8,544,416 | B2 | * | 10/2013 | Gabriel | B62B 3/006 119/455 |
| 8,739,737 | B2 | * | 6/2014 | Conger | A01K 1/0058 119/419 |
| 2014/0238309 | A1 | | 8/2014 | Hahn | |

(Continued)

*Primary Examiner* — Yvonne R Abbott-Lewis
(74) *Attorney, Agent, or Firm* — Asgaard Patent Services, LLC; F. Wayne Thompson, Jr.

(57) ABSTRACT

A rack for animal cages may comprise multiple levels stacked together in a vertical orientation, each level acts as a frame configured to support one or more tubs that serve as cages. An example rack for animal cages comprises a first enclosure, a first top panel, and two glides. The first enclosure having a floor, four exterior sidewalls, and a lip extending outwardly from a top surface of at least two of the four exterior sidewalls. Each of the two glides comprises a first longitudinal groove configured to receive an edge portion of the first top panel therein and a second longitudinal groove configured to removably receive a portion of the lip extending outwardly from the top surface of the first enclosure. The two glides are positioned to support the first top panel and the first enclosure therebetween, and configured to position the first top panel so that it covers the first enclosure when it is positioned therebetween.

14 Claims, 5 Drawing Sheets

(56) References Cited

U.S. PATENT DOCUMENTS

2016/0044892 A1 2/2016 Hahn

* cited by examiner

RACK FOR ANIMAL CAGES

CROSS REFERENCE TO RELATED APPLICATION

This application is a continuation of U.S. patent application Ser. No. 14/824,772, filed on Aug. 12, 2015, which claims the benefit of U.S. Provisional Application Ser. No. 62/036,650, filed on Aug. 13, 2014, the entireties of both applications are incorporated herein by reference.

TECHNICAL FIELD

This disclosure relates to implementations of a rack for animal cages.

BACKGROUND

Cages are routinely used to house small animals. With the increased popularity of keeping pet reptiles, there has developed the need to provide caging which meets their specific environmental needs. In general, reptiles require an environment with temperatures and humidity levels greater than what would be comfortable for their human owners.

Reptile caging comes in many forms with some being more suitable than others. Some example caging styles include adapting a fish tank for use with reptiles by adding a specifically designed lid and an artificial heat source, a purpose built vivarium such as the one described in U.S. Pat. No. 5,803,019 to Heilborn et al., and vertical caging systems which rely on removable/semi-removable tubs. Commercial breeders and some hobbyist prefer vertical caging systems because such systems minimize wasted space and provide for the efficient care and maintenance of the enclosed reptiles.

Numerous vertical caging systems, also referred to as "racks" or "rack systems", are available on the commercial market. In general, vertical caging systems rely on a support structure comprised of multiple levels each of which is configured to support one or more removable tubs that act as an enclosure. Each tub is at least comprised of a floor having connecting side walls. The lid for each tub is typically an integral portion of the support structure configured to receive the tub. The support structure is typically made of stainless steel and requires welding to complete assembly. Heating elements are typically attached to the support structure and positioned underneath the tubs.

DETAILED DESCRIPTION

Implementations of a rack for animal cages are provided. In some implementations, a rack comprises multiple levels stacked together in a vertical orientation. Each level of the rack acts as a frame configured to support one or more tubs that serve as enclosures. In this way, animals may be housed in the rack.

An example rack for animal cages comprises a first enclosure, a first top panel, and two glides. The first enclosure having a floor, four exterior sidewalls, and a lip extending outwardly from a top surface of at least two of the four exterior sidewalls. Each of the two glides comprises a first longitudinal groove configured to receive an edge portion of the first top panel therein and a second longitudinal groove configured to removably receive a portion of the lip extending outwardly from the top surface of the first enclosure. The two glides are positioned to support the first top panel and the first enclosure therebetween, and configured to position the first top panel so that it covers the first enclosure when it is positioned therebetween.

Another example rack for animal cages comprises a first removable enclosure, a first top panel, and a first bracket. The first removable enclosure having a floor, four exterior sidewalls, and a lip extending outwardly from a top surface of at least two of the four exterior sidewalls. The first bracket has a lip thereon and is positioned so that the lip thereof rests against a portion of the first top panel. The first top panel is positioned to cover the first removable enclosure when it is positioned thereunder.

Figure 1A:
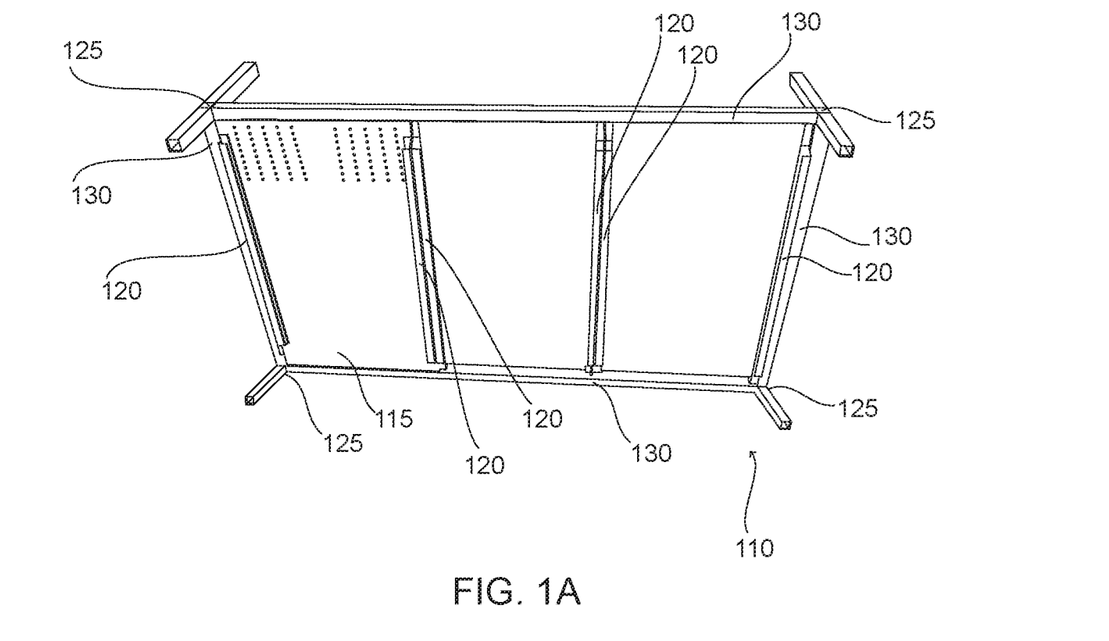
FIG. 1A illustrates a bottom perspective view of an example implementation of a level of a rack for animal cages according to the principles of the present disclosure.
Figure 1B:
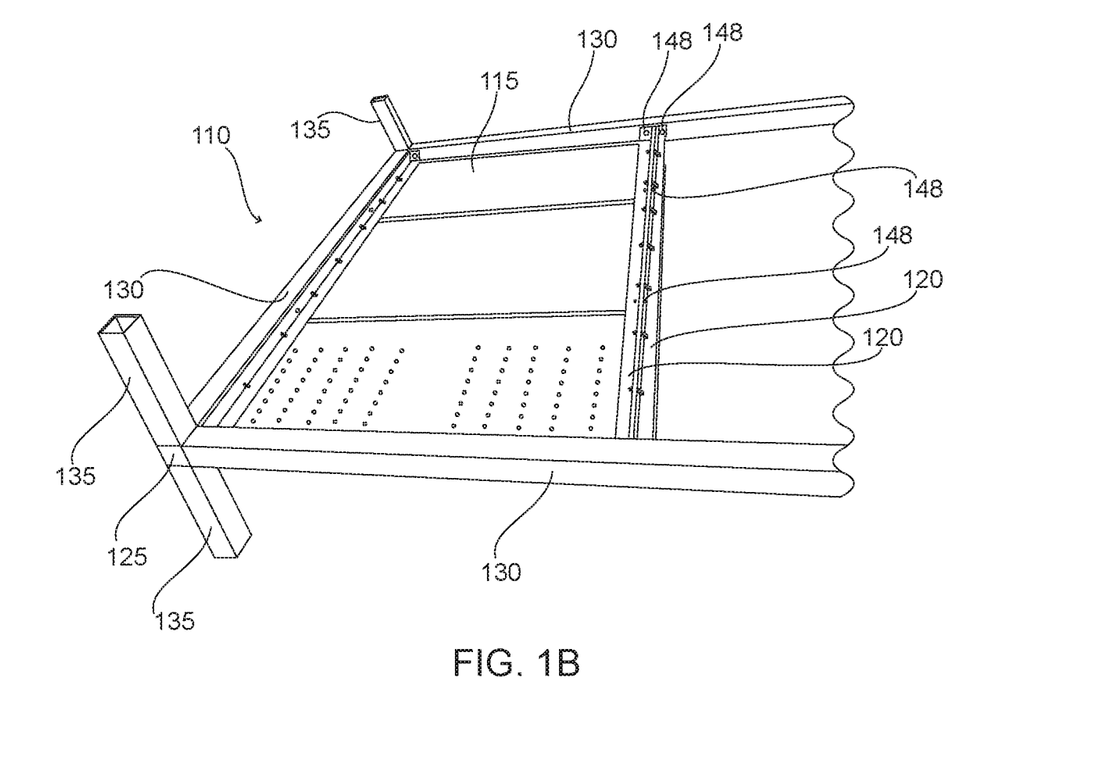
FIG. 1B illustrates a top view of an enlarged portion of the level shown in FIG. 1A.
Figure 1C:
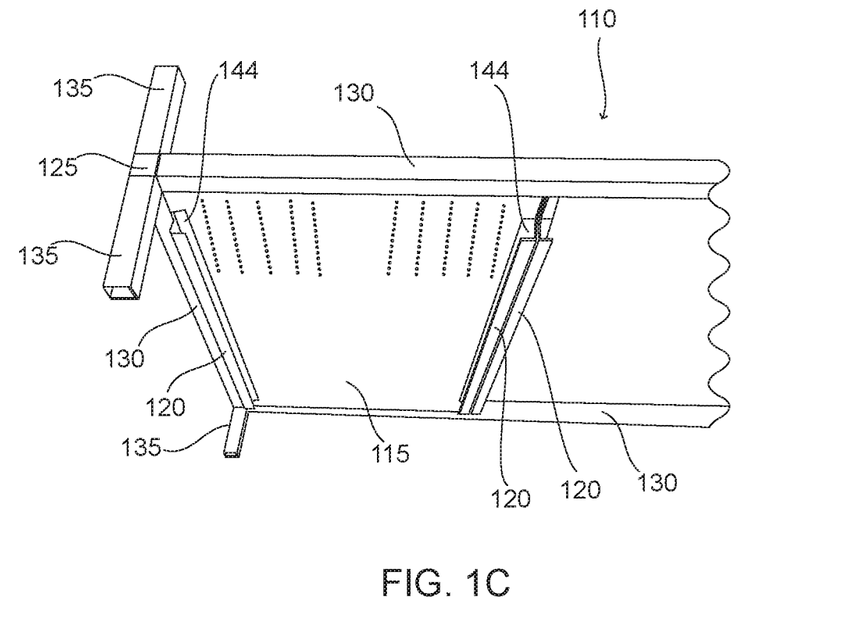
FIG. 1C illustrates a bottom view of an enlarged portion of the level shown in FIG. 1A.

FIGS. 1A-1C illustrate a portion of an example level 110 of a rack 100 for animal cages. In some implementations, multiple levels 110 may be stacked together in a vertical orientation to form a complete rack 100 (see, e.g., FIG. 5A). In some implementations, each assembled level 110 acts as a frame configured to support thereon one or more tubs 105 which act as enclosures (see, e.g., FIG. 5B). In this way, animals may be housed in the rack 100.

In some implementations, tubs such as those disclosed in U.S. patent application Ser. No. 13/775,604, filed on Feb. 25, 2013, may be used with the rack 100 disclosed herein. In some implementations, each tub 105 has a generally rectangular shape defined by a floor and four connected side walls. In some implementations, a tub 105 may have a lip 106 extending from the top surface of each side wall. In some implementations, a tub 105 may only have a lip 106 extending from the top surface of two opposing side walls. In some implementations, any tub 105 configured and/or capable of being received by the glides 120 may be used with the rack 100 disclosed herein.

Figure 5A:
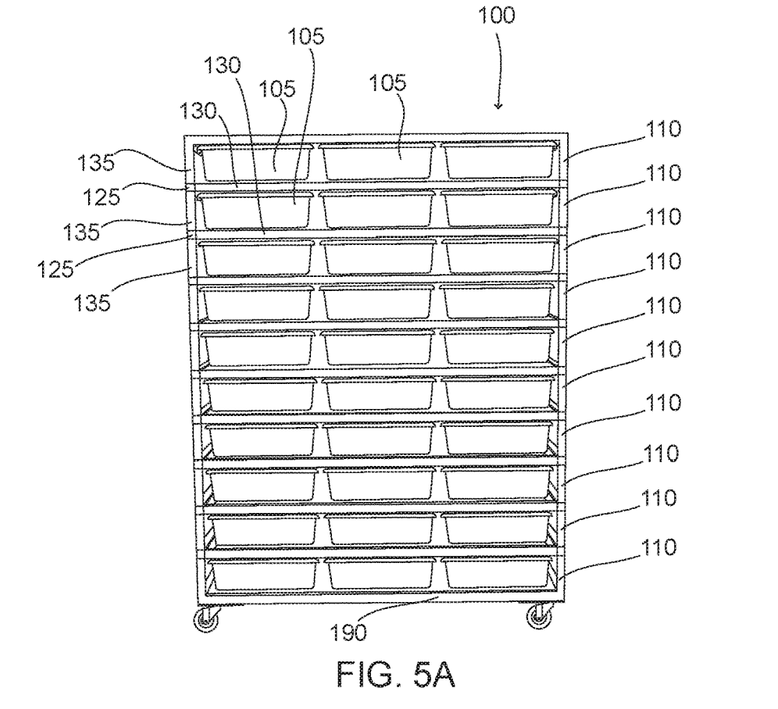
FIG. 5A illustrates an example implementation of a rack for animal cages according to the principles of the present disclosure.

As shown in FIGS. 1A, 1B, 1C, and 5A, in some implementations, each level 110 of the rack 100 may be comprised of three top panels 115, six glides 120, four joint connectors 125, four vertically oriented legs 135, and/or four cross beams 130. In some implementations, as shown in FIG. 5A, each level 110 of the rack 100 is configured to be secured to another level 110 and/or a base frame 190. In some implementations, the base frame 190 may include casters.

Figure 2:
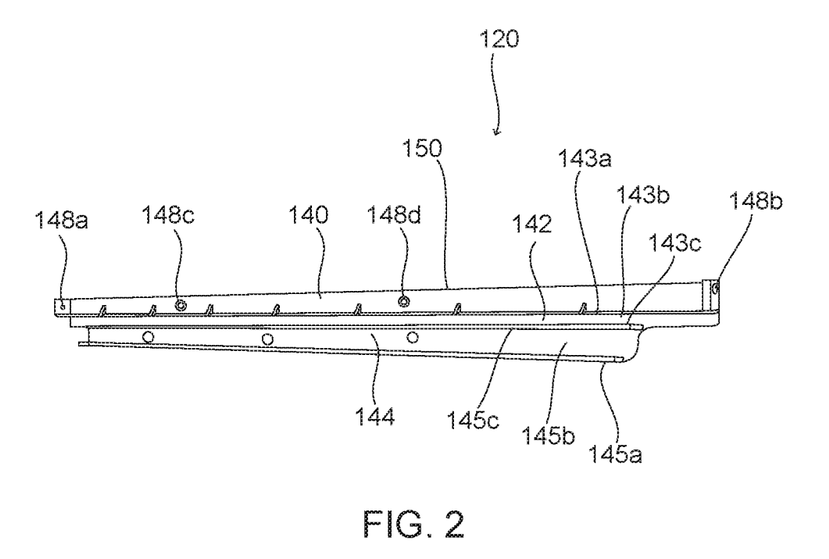
FIG. 2 illustrates an example glide according to the principles of the present disclosure.

In some implementations, as shown in FIG. 2, a glide 120 may be comprised of an elongated body member 140 comprised of a first longitudinal groove 142 and a second longitudinal groove 144.

In some implementations, the first longitudinal groove 142 may be comprised of a first side wall 143a, a second side wall 143c, and a back wall 143b (referred to as side walls 143 collectively) (see, e.g., FIG. 2). In this way, the side walls 143 form an opening or groove. In some implementations, the back wall 143b may be positioned at a perpendicular angle relative to the first side wall 143a and the second side wall 143c. In some implementations, the first side wall 143a and/or the second side wall 143c may not extend the entire length of the first longitudinal groove 142. In some implementations, the first longitudinal groove 142 may only have a first side wall 143a and a second side wall 143c. In some implementations, each of the side walls 143 may be of differing length.

In some implementations, the first longitudinal groove 142 may be configured to receive a portion of a top panel 115 therein (seem e.g., FIG. 1C). In some implementations, two glides 120 may be oriented so that the opening of the first longitudinal groove 142 of each glide 120 is facing the other (see, e.g., FIG. 1A). In this way, each side 117 of the top panel 115 may be supported therebetween (see, e.g., FIG. 1C). In some implementations, the top panel 115 may be flexible and thereby removable by the end user.

In some implementations, the second longitudinal groove 144 may be comprised of a first side wall 145a, a second side wall 145c, and a back wall 145b (referred to as side walls 145 collectively) (see, e.g., FIG. 2). In this way, the side walls 145 form an opening or groove. In some implementations, the back wall 145b may be positioned at a perpendicular angle relative to the first side wall 145a and the second side wall 145c. In some implementations, the second longitudinal groove 144 may only have a first side wall 145a and a second side wall 145c. In some implementations, each of the side walls 145 may be of differing length.

Figure 5B:
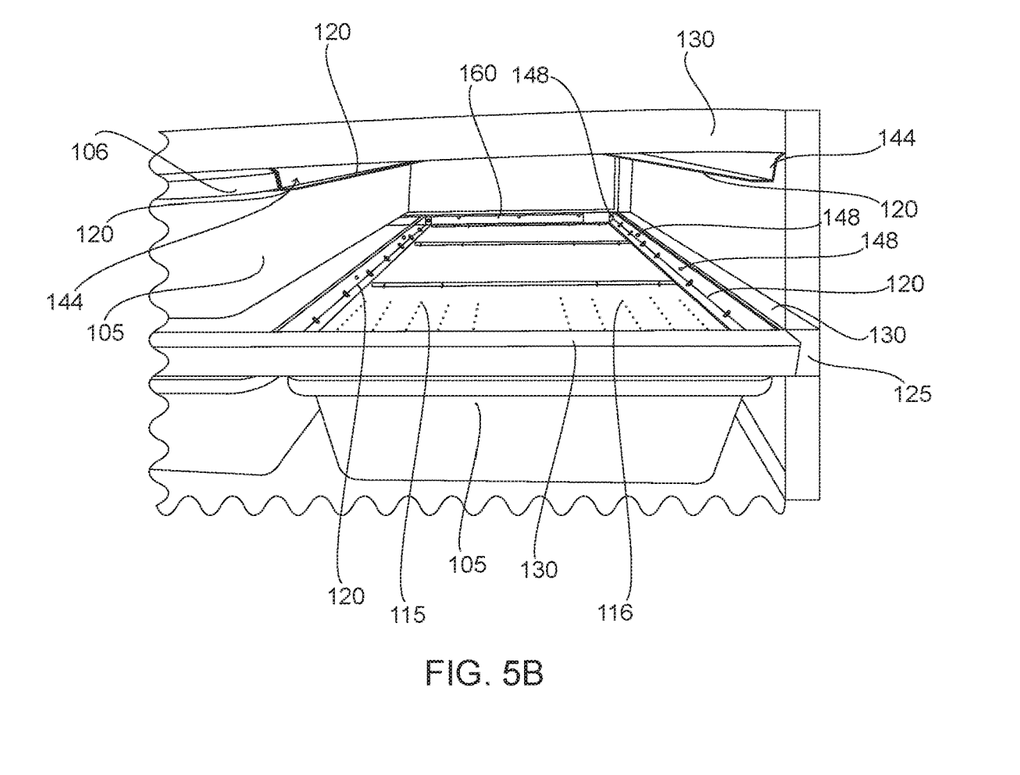
FIG. 5B illustrates an enlarged view of a portion of the rack for animal cages shown in FIG. 5A.

In some implementations, the second longitudinal groove 144 may be configured to receive a portion of the lip 106 of a tub 105 therein (see, e.g., FIG. 5B). In some implementations, two glides 120 may be oriented so that the opening of the second longitudinal groove 144 of each glide 120 is facing the other (see, e.g., FIG. 1C). In this way, a tub 105 may be supported therebetween (see, e.g., FIGS. 5A and 5B). In some implementations, a tub 105 may be slide into and out of the second longitudinal groove 144 by the caretaker.

As shown in FIG. 2, in some implementations, the second side wall 143c of the first longitudinal groove 142 may be located oppositely of the second side wall 145c of the second longitudinal groove 144. In some implementations, the second side wall 143c of the first longitudinal groove 142 and second side wall 145c of the second longitudinal groove 144 are opposite sides of the same structure (see, e.g., FIG. 2). In some implementations, the second side wall 143c of the first longitudinal groove 142 and second side wall 145c of the second longitudinal groove 144 are not opposite sides of the same structure As shown in FIG. 2, in some implementations, the body member 140 of the glide 120 may have four openings 148a, 148b, 148c, 148d (referred to as openings 148 collectively) therethrough. In some implementations, the openings 148 may be positioned adjacent the top side 150 of the glide 120 (see, e.g., FIG. 2). In some implementations, the openings 148 may be configured to receive a screw, bolt, and/or other fastening device therethrough. In this way, by inserting a screw (for example) through the openings 148 the glide 120 may be secured to the cross beams 130 of the rack 100 (see, e.g., FIG. 5B).

As shown in FIG. 1B, in some implementations, two glides 120 may be placed so that their backsides are touching. In this position, the openings 148c, 148d of each glide 120 may be in alignment and a screw or other suitable fastener may be used to secured the glides 120 together (see, e.g., FIG. 1B).

In some implementations, more than six or less than six glides 120 may be used on a level 110 of the rack 100. In this way, the number and/or size of the tubs 105 supported on each level 110 of the rack 100 may be varied based on user needs.

Figure 3:
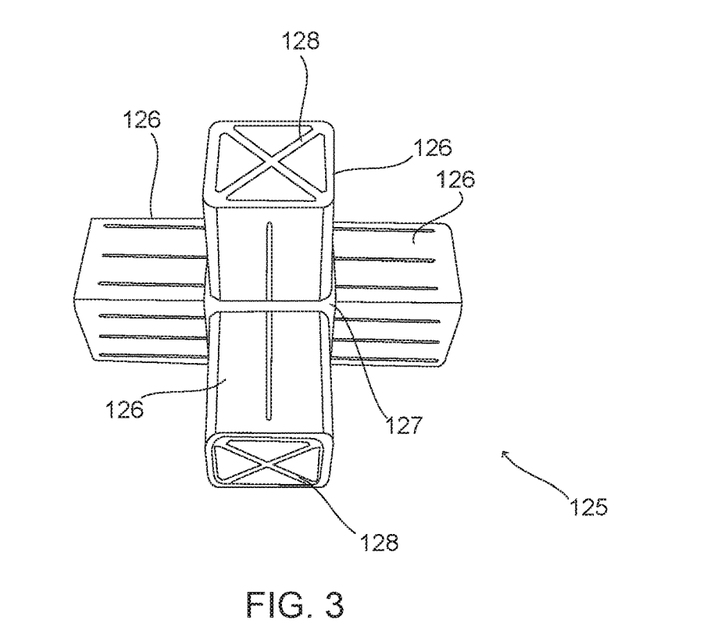
FIG. 3 illustrates an example joint connector according to the principles of the present disclosure.

As shown in FIG. 3, in some implementations, a joint connector 125 may be comprised of four spokes 126 extending from a body portion 127. In some implementations, there may be more than four or less than four spokes 126 extending from the body portion 127 of the joint connector 125 (e.g., three spokes). In some implementations, each spoke 126 may have an interior opening supposed by an X-shaped structure 128 extending therethrough (see, e.g., FIG. 3). In this way, the structural strength of the spoke 126 may be increased while potentially minimizing the overall weight of the joint connector 125. In some implementations, the interior opening of each spoke 126 may not have any structure therein. In some implementations, each spoke 126 may be a solid piece of material.

As shown in FIG. 1A, in some implementations, the spokes 126 of a joint connector 125 may be configured to be received within an interior portion (not shown) of the cross beams 130 used to assemble a level 110 of the rack 100. In this way, the cross beams 130 in conjunction with the joint connectors 125 may form a portion of a frame (or support structure). In some implementations, the spokes 126 of a joint connector 125 may be configured to be received within an interior portion of the vertically oriented legs 135 (see, e.g., FIG. 5A). In this way, the vertically oriented legs 135 in conjunction with the joint connectors 125 may be used to connect multiple levels 110 of the rack 100 together (see, e.g., FIG. 5A). In some implementations, more than four or less than four connecters 125 may be used to assemble a single level 110 of the rack 100.

Figure 4:
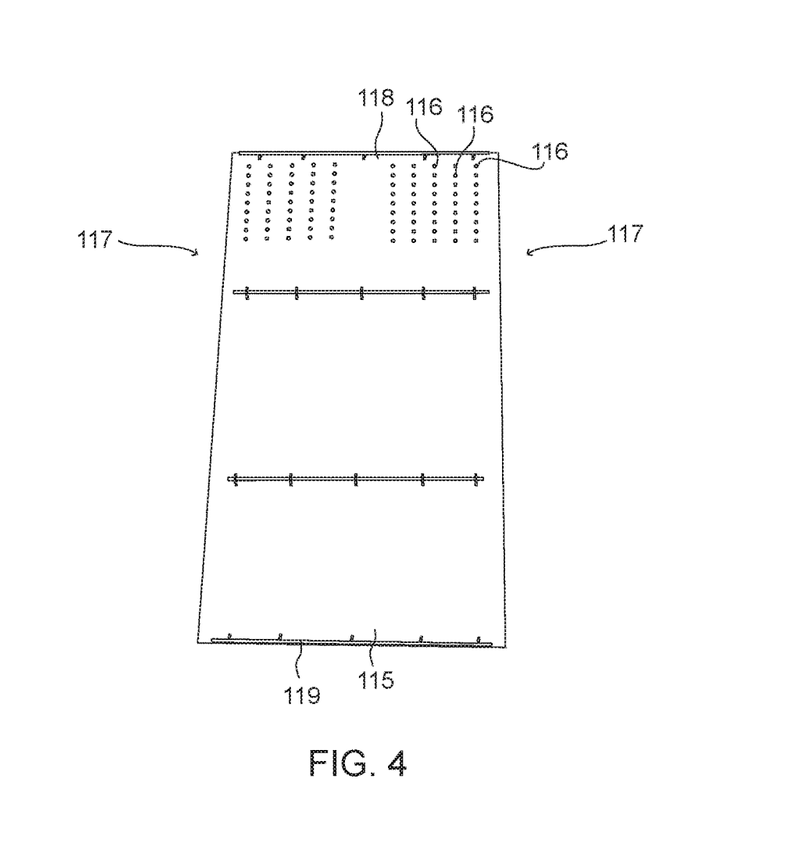
FIG. 4 illustrates an example top panel according to the principles of the present disclosure.

As shown in FIG. 4, in some implementations, a top panel 115 may have the general shape of a rectangle. In some implementations, a top panel 115 may be any suitable shape. In some implementations, the top panel 115 may have a series of openings 116 extending therethrough (see, e.g., FIG. 4). In this way, the openings 116 facilitates air exchange between the interior of a tub 105 and the exterior environment (see, e.g., FIG. 5B). In some implementations, the diameter of the openings 116 through a top panel 115 may be varied to regulate the humidity within a tub 105 located underneath. In some implementations, the top panel 115 may be configured so that a portion of each longitudinal edge 117 may be received with the first longitudinal groove 142 of a glide 120.

Figure 6A:
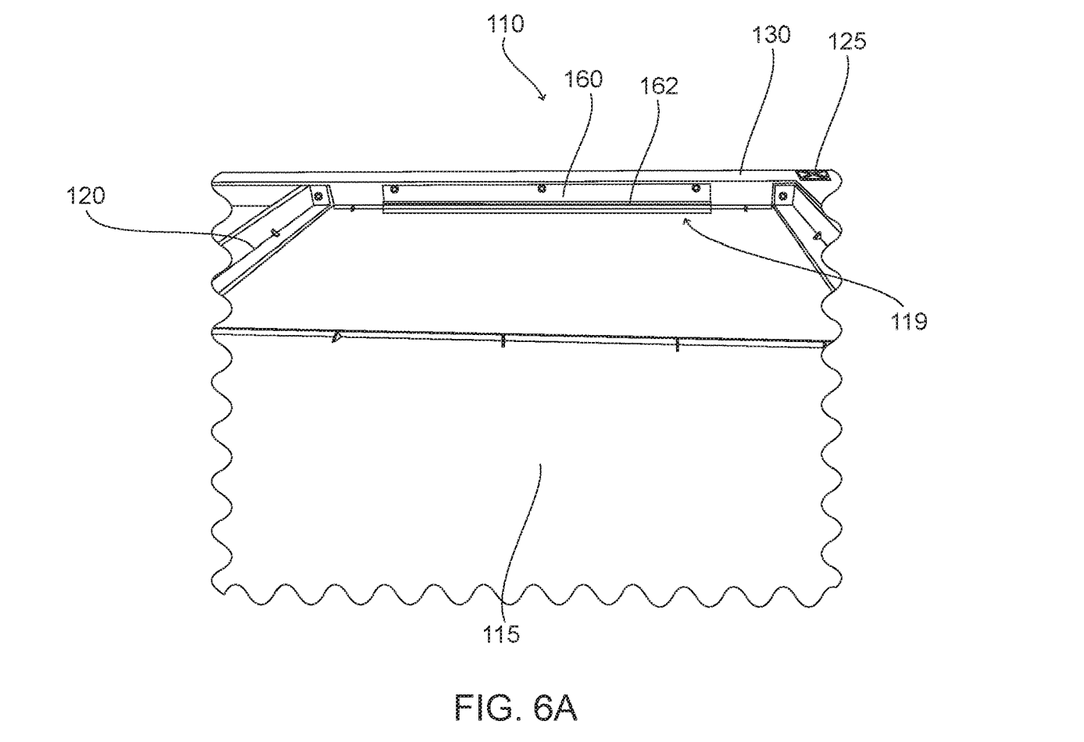
FIGS. 6A and 6B illustrate an example bracket according to the principles of the present disclosure.
Figure 6B:
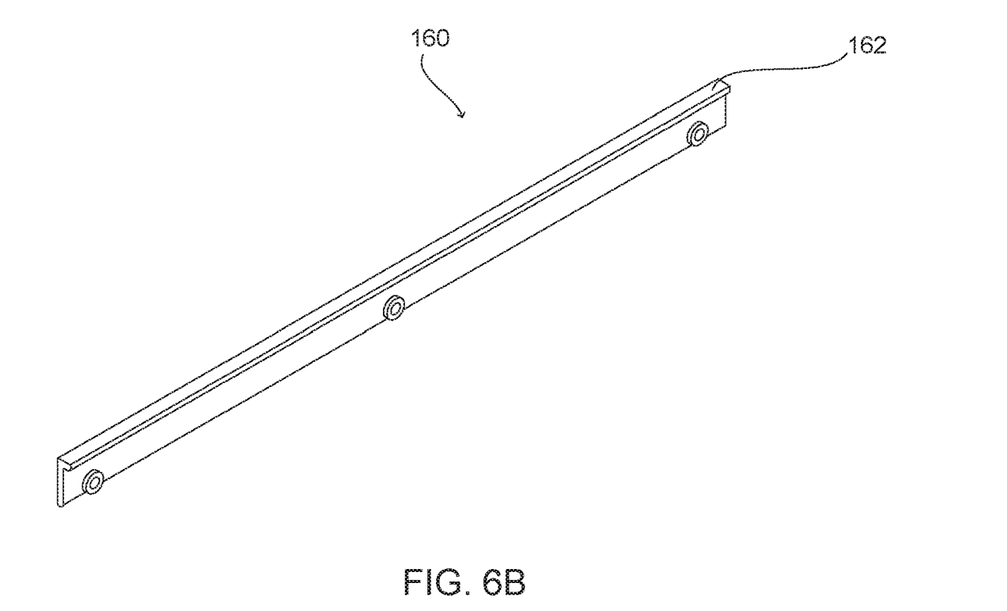

As shown in FIGS. 6A and 6B, in some implementations, a bracket 160 may have a lip 162 thereon. In some implementations, the bracket 160 may be secured to the cross beam 130 of a level 110 (see, e.g., FIG. 6A). In some implementations, the bracket 160 may be oriented so that the lip 162 rest against a portion of the forward edge 118 or rearward edge 119 of the top panel 115 (see, e.g., FIG. 6A). In this way, the bracket 160 may be used to reinforce the edges of the top panel 115 not received within a portion of the glide 120 (i.e., the forward edge 118 and/or the rearward edge 119 of the top panel 115). This may prevent an animal housed within a tub 105 located below the top panel 115 from being able to push up an unsupported edge of the top panel 115 and thereby escape. In some implementations, a bracket 160 may be secured to the backside of a cross beam 130 located on the backside of a rack 100 so that it protrudes below a bottom side of the cross beam 130. In this way, the bracket 160 may act as an over travel stop for a tub 105 being inserted into a glide 120 from a front side of the rack 100.

In some implementations, the glide 120 may be a single unitary piece. In some implementations, the glide 120 may be injection molded as a single unitary piece. In some implementations, the glide 120 may be manufactured from a polymer material. In this way, the glide 120 may be lighter than a glide manufactured from a metal.

In some implementations, the joint connector 125 may be injection molded. In this way, the joint connector 125 may be cheaper to manufacture than a comparable machined joint connector. In some implementations, the joint connector 125 may be manufactured from a polymer material. In this way, the joint connector 125 may be lighter than a joint connector manufactured from a metal.

In some implementations, the top panel 115 may be injection molded. In this way, the top panel 115 may be cheaper to manufacture than a comparable machined top panel. In some implementations, the top panel 115 may be manufactured from a polymer material.

In some implementations, shipping weight may be reduced by up to 40% when polymer injection molding, instead of metal (e.g., 300 series stainless steel), is used to make the components (e.g., the top panels 115, glides 120, joint connectors 125, vertically oriented legs 135, and/or cross beams 130 described herein) of the rack 100 described herein.

In some implementations, by using the top panels 115, glides 120, joint connectors 125, vertically oriented legs 135, and/or cross beams 130 described herein, the manufacturer may be able to ship the rack unassembled. In this way, the cost of shipping may be reduced.

In some implementations, by using the top panels 115, glides 120, joint connectors 125, vertically oriented legs 135, and/or cross beams 130 described herein, the end user may be able to assemble a rack with hand tools (e.g., a mallet and/or a screw driver).

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A rack for animal cages comprising:
a first enclosure having a floor, four exterior sidewalls, and a lip extending outwardly from a top surface of at least two of the four exterior sidewalls;
a first top panel; and
two glides, each of the two glides comprises a first longitudinal groove configured to receive an edge portion of the first top panel therein and a second longitudinal groove configured to removably receive a portion of the lip extending outwardly from the top surface of the first enclosure;
wherein the two glides are positioned to support the first top panel and the first enclosure therebetween;
wherein the two glides are configured to position the first top panel so that it covers the first enclosure when it is positioned therebetween.

2. The rack for animal cages of claim 1, wherein the first longitudinal groove of each glide comprises a first sidewall, a second sidewall, and a back wall; and the second longitudinal groove of each glide comprises a first sidewall, a second sidewall, and a back wall.

3. The rack for animal cages of claim 2, wherein the second sidewall of the first longitudinal groove and the second sidewall of the second longitudinal groove, of each glide, are opposite sides of the same structure.

4. The rack for animal cages of claim 2, wherein the back wall of each first longitudinal groove is at a perpendicular angle relative to the first sidewall and the second sidewall thereof; the back wall of each second longitudinal groove is at a perpendicular angle relative to the first sidewall and the second sidewall thereof.

5. The rack for animal cages of claim 1, wherein the two glides are oriented so that an opening defined by the first longitudinal groove of each glide is facing the other, thereby allowing the first top panel to be supported therebetween.

6. The rack for animal cages of claim 5, wherein the two glides are oriented so that an opening defined by the second longitudinal groove of each glide is facing the other, thereby allowing the first enclosure to be removably positioned therebetween.

7. The rack for animal cages of claim 1, further comprising a first bracket having a lip thereon, the first bracket is positioned to that the lip thereof rests against a portion of the first top panel.

8. The rack for animal cages of claim 7, wherein the two glides and the first bracket are made of injection molded polymer.

9. The rack for animal cages of claim 1, further comprising a first horizontal crossbeam; and a first bracket having a lip thereon; wherein the first bracket is secured to the first horizontal crossbeam so that the lip thereof protrudes from a bottom side of the first horizontal crossbeam into the travel path of the first enclosure and thereby acts as an overtravel stop for the first enclosure.

10. The rack for animal cages of claim 9, wherein the two glides and the first bracket are made of injection molded polymer.

11. The rack for animal cages of claim 1, wherein the two glides are made of injection molded polymer.

12. A rack for animal cages comprising:
a first removable enclosure having a floor, four exterior sidewalls, and a lip extending outwardly from a top surface of at least two of the four exterior sidewalls;
a first top panel; and
a first bracket having a lip thereon;
wherein the first bracket is positioned so that the lip thereof rests against a portion of the first top panel;
wherein the first top panel is positioned to cover the first removable enclosure when it is positioned thereunder.

13. The rack for animal cages of claim 12, further comprising a first horizontal crossbeam; and a second bracket having a lip thereon; wherein the second bracket is secured to the first horizontal crossbeam so that the lip thereof protrudes below a bottom side of the first horizontal crossbeam into the travel path of the first removable enclosure and thereby acts as an overtravel stop for the first removable enclosure.

14. The rack for animal cages of claim 13, wherein the first bracket and the second bracket are made of injection molded polymer.

* * * * *